(12) United States Patent
Shimizu et al.

(10) Patent No.: US 11,515,568 B2
(45) Date of Patent: Nov. 29, 2022

(54) LAMINATED BATTERY AND MANUFACTURING METHOD OF LAMINATED BATTERY

(71) Applicant: Honda Motor Co., Ltd., Tokyo (JP)

(72) Inventors: Wataru Shimizu, Saitama (JP); Masahiro Ohta, Saitama (JP); Toru Sukigara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 222 days.

(21) Appl. No.: 16/711,437

(22) Filed: Dec. 12, 2019

(65) Prior Publication Data
US 2020/0194839 A1 Jun. 18, 2020

(30) Foreign Application Priority Data
Dec. 13, 2018 (JP) .............................. JP2018-233431

(51) Int. Cl.
*H01M 10/0583* (2010.01)
*H01M 50/538* (2021.01)
*H01M 10/04* (2006.01)
*H01M 10/052* (2010.01)

(52) U.S. Cl.
CPC ..... *H01M 10/0583* (2013.01); *H01M 50/538* (2021.01); *H01M 10/0459* (2013.01); *H01M 10/052* (2013.01); *Y02E 60/10* (2013.01); *Y02P 70/50* (2015.11)

(58) Field of Classification Search
CPC ............. H01M 10/052; H01M 50/538; H01M 10/0459; H01M 10/0583; Y02E 60/10; Y02P 70/50
USPC ......................................................... 429/11
See application file for complete search history.

(56) References Cited

U.S. PATENT DOCUMENTS

| 2003/0082446 A1* | 5/2003 | Chiang | H01M 4/0426 |
| | | | 429/209 |
| 2012/0288747 A1* | 11/2012 | Naoi | H01G 11/76 |
| | | | 429/178 |
| 2017/0222244 A1* | 8/2017 | Kim | H01M 10/0525 |

FOREIGN PATENT DOCUMENTS

| CN | 1776939 | 5/2006 |
| CN | 101461087 | 6/2009 |
| CN | 102473903 | 5/2012 |
| CN | 202396078 | 8/2012 |
| CN | 104584274 | 4/2015 |
| CN | 107039680 | 8/2017 |
| JP | S5650066 | 5/1981 |

(Continued)

OTHER PUBLICATIONS

"Office Action of Japan Counterpart Application" with English translation thereof, dated Oct. 5, 2021, p. 1-p. 8.

(Continued)

*Primary Examiner* — Jonathan G Jelsma
*Assistant Examiner* — Omar M Kekia
(74) *Attorney, Agent, or Firm* — JCIPRNET

(57) ABSTRACT

The disclosure provides a laminated battery that can realize a laminated structure in which electrode composite material portions are not displaced, can simplify the manufacturing process, and has improved production yield, and provides a manufacturing method thereof. A positive electrode structure and a negative electrode structure in comb shapes are respectively produced with electrode composite material layers positioned in advance, and these are fitted to produce a laminate serving as a battery.

16 Claims, 4 Drawing Sheets

(56) References Cited

FOREIGN PATENT DOCUMENTS

| | | |
|---|---|---|
| JP | H031455 | 1/1991 |
| JP | 2000082495 | 3/2000 |
| JP | 2000106154 | 4/2000 |
| JP | 2006147300 | 6/2006 |
| JP | 2013219057 | 10/2013 |
| JP | 2015118870 | 6/2015 |

OTHER PUBLICATIONS

"Office Action of China Counterpart Application" with English translation thereof, dated Aug. 22, 2022, p. 1-p. 21.

* cited by examiner

LAMINATED BATTERY AND MANUFACTURING METHOD OF LAMINATED BATTERY

CROSS-REFERENCE TO RELATED APPLICATION

This application claims the priority benefit of Japan Application No. 2018-233431, filed on Dec. 13, 2018. The entirety of the above-mentioned patent application is hereby incorporated by reference herein and made a part of this specification.

BACKGROUND

Technical Field

The disclosure relates to a laminated battery and a manufacturing method of the laminated battery. More specifically, the disclosure relates to a laminated battery that can realize a laminated structure in which electrode composite material portions are not displaced, can simplify the manufacturing process, and has improved production yield, and to a manufacturing method thereof.

Description of Related Art

Conventionally, as secondary batteries having high energy density, lithium ion secondary batteries are widely used. A lithium ion secondary battery has a structure in which a separator is present between a positive electrode and a negative electrode and which is filled with a liquid electrolyte (electrolyte solution).

Here, since the electrolyte solution of the lithium ion secondary battery is usually a flammable organic solvent, in particular, safety against heat may be a problem. Therefore, a lithium ion solid battery using an inorganic solid electrolyte in place of the organic liquid electrolyte has been proposed (see Patent Document 1).

The lithium ion solid battery has a structure in which a solid electrolyte layer is disposed between a positive electrode layer and a negative electrode layer. Usually, the positive electrode layer and the negative electrode layer are formed by carrying an electrode composite material including an electrode active material powder and a solid electrolyte powder on a metal foil or the like serving as a current collector.

Here, a lithium ion solid battery is manufactured, for example, by the following method: coating an electrode composite material on both surfaces of a current collector foil to manufacture an electrode sheet; disposing a solid electrolyte on the upper surface of the electrode composite material of the electrode sheet to form a laminate; cutting out the laminate in any shape; producing a positive electrode sheet and a negative electrode sheet of desired sizes; alternately laminating the positive electrode sheet and the negative electrode sheet; and then performing press molding (see Patent Document 2).

Here, unlike the battery with the liquid electrolyte, in order for the solid battery to ensure and maintain a desired performance, after the laminate serving as the battery is formed, it is necessary to perform press molding at a high surface pressure and restraint at a high pressure to improve the adhesion of the laminated interfaces.

However, when the positive electrode sheet and the negative electrode sheet cut to desired sizes are laminated, the position of each electrode composite material portion containing the electrode active material may not match and may be displaced. For example, when an electrode sheet with a thick basis weight is produced or when a laminate with an increased number of lamination layers is formed for the purpose of increasing the capacity, due to the difference in thickness between tab welded portions and the electrode composite material portions, the electrode composite material portions are likely to be displaced by tab welding.

Then, the displacement of the electrode composite material portions in the laminate serving as the solid battery causes the deterioration of the yield of the battery, and the decrease of durability or safety. For this reason, when a solid battery is produced according to the conventional method, the management for improving the position accuracy of the electrode composite material portions has been necessary, and the process has been complicated.

RELATED ART

Patent Document

[Patent Document 1] Japanese Laid-open No. 2000-106154
[Patent Document 2] Japanese Laid-open No. 2015-118870

The disclosure has been made in view of the above-mentioned background, and an object thereof is to provide a laminated battery that can realize a laminated structure in which electrode composite material portions are not displaced, can simplify the manufacturing process, and has improved production yield, and to provide a manufacturing method thereof.

The inventors have intensively studied a method for laminating electrode sheets in a battery. Then, it has been found that the above problems can be solved by a method of respectively producing a positive electrode structure and a negative electrode structure in comb shapes with electrode composite material layers positioned in advance and fitting them, and the disclosure has been completed.

SUMMARY

That is, the disclosure provides a laminated battery including a positive electrode sheet and a negative electrode sheet, wherein the positive electrode sheet alternately has positive electrode composite material coated portions and positive electrode composite material uncoated portions on at least one surface of a positive electrode current collector, wherein in the positive electrode composite material coated portions, a positive electrode composite material is laminated, and in the positive electrode composite material uncoated portions, the positive electrode composite material is not laminated, and the positive electrode sheet is folded in a manner of mountain folds and valley folds alternated to form a comb-shaped positive electrode structure having a plurality of positive electrode portion laminates in which the adjacent positive electrode composite material coated portions are disposed on both outer layers, a plurality of positive electrode opening portions formed between the adjacent positive electrode portion laminates, and positive electrode portion laminate connecting portions for connecting the adjacent positive electrode portion laminates; the negative electrode sheet is folded in a manner of mountain folds and valley folds alternated to form a comb-shaped negative electrode structure having a plurality of negative electrode portion laminates, a plurality of negative electrode opening portions formed between the adjacent negative electrode portion laminates, and negative electrode portion laminate connecting portions for connecting the adjacent negative electrode portion laminates; and the negative electrode portion laminates of the negative electrode structure are inserted into the positive electrode opening portions of the positive electrode structure, and the positive electrode portion laminates of the positive electrode structure are inserted into the negative electrode opening portions of the negative electrode structure to form a laminate in which the positive electrode structure and the negative electrode structure are fitted.

The positive electrode composite material uncoated portions may be disposed in the positive electrode portion laminate connecting portions.

The negative electrode sheet may be a sheet made of a negative electrode active material.

The negative electrode sheet may alternately have negative electrode composite material coated portions and negative electrode composite material uncoated portions on at least one surface of a negative electrode current collector, wherein in the negative electrode composite material coated portions, a negative electrode composite material is laminated, and in the negative electrode composite material uncoated portions, the negative electrode composite material is not laminated; in the negative electrode portion laminates, the adjacent negative electrode composite material coated portions may be disposed on both outer layers; and the negative electrode composite material uncoated portions may be disposed in the negative electrode portion laminate connecting portions.

The area of the negative electrode composite material coated portions may be greater than or equal to the area of the positive electrode composite material coated portions.

A positive electrode tab may be connected to the positive electrode portion laminate connecting portions, and a negative electrode tab may be connected to the negative electrode portion laminate connecting portions.

At least one of the positive electrode sheet and the negative electrode sheet may have a solid electrolyte layer on a surface.

At least one of a solid electrolyte sheet and a separator may be disposed between the positive electrode structure and the negative electrode structure.

An outermost layer of the laminated battery may be the solid electrolyte sheet or the separator, and the negative electrode portion laminates may be disposed on an inner side thereof.

The solid electrolyte sheet may be a sheet made of a solid electrolyte.

The disclosure further provides a manufacturing method of a laminated battery including a positive electrode sheet and a negative electrode sheet, the manufacturing method including: a positive electrode sheet forming step of forming a positive electrode sheet alternately having positive electrode composite material coated portions and positive electrode composite material uncoated portions on at least one surface of a positive electrode current collector, wherein in the positive electrode composite material coated portions, a positive electrode composite material is laminated by discontinuously coating the positive electrode composite material, and in the positive electrode composite material uncoated portions, the positive electrode composite material is not laminated; a positive electrode structure forming step of folding the positive electrode sheet in a manner of mountain folds and valley folds alternated to form a comb-shaped positive electrode structure including a plurality of positive electrode portion laminates in which the adjacent positive electrode composite material coated portions are disposed on both outer layers, a plurality of positive electrode opening portions formed between the adjacent positive electrode portion laminates, and positive electrode portion laminate connecting portions for connecting the adjacent positive electrode portion laminates; a negative electrode structure forming step of folding the negative electrode sheet so that mountain folds and valley folds alternate to form a comb-shaped negative electrode structure including a plurality of negative electrode portion laminates, a plurality of negative electrode opening portions formed between the adjacent negative electrode portion laminates, and negative electrode portion laminate connecting portions for connecting the adjacent negative electrode portion laminates; and a fitting step of inserting the negative electrode portion laminates of the negative electrode structure into the positive electrode opening portions of the positive electrode structure, inserting the positive electrode portion laminates of the positive electrode structure into the negative electrode opening portions of the negative electrode structure, and fitting the positive electrode structure and the negative electrode structure to form a battery laminate.

In the manufacturing method of the laminated battery, in the positive electrode structure forming step, the positive electrode composite material uncoated portions may be disposed in the positive electrode portion laminate connecting portions.

In the manufacturing method of the laminated battery, the negative electrode sheet may be a sheet made of a negative electrode active material.

In the manufacturing method of the laminated battery, the negative electrode sheet may have negative electrode composite material coated portions and negative electrode composite material uncoated portions on a negative electrode current collector, wherein in the negative electrode composite material coated portions, a negative electrode composite material is laminated, and in the negative electrode composite material uncoated portions, the negative electrode composite material is not laminated; and in the negative electrode structure forming step, the negative electrode composite material uncoated portions may be disposed in the negative electrode portion laminate connecting portions.

In the manufacturing method of the laminated battery, the area of the negative electrode composite material coated portions may be greater than or equal to the area of the positive electrode composite material coated portions.

In the manufacturing method of the laminated battery, at least one of the positive electrode sheet and the negative electrode sheet may have a solid electrolyte layer on a surface.

In the manufacturing method of the laminated battery, in the fitting step, at least one of a solid electrolyte sheet and a separator is disposed between the positive electrode portion laminates and the negative electrode portion laminates.

In the manufacturing method of the laminated battery, in the fitting step, an outer periphery of the battery laminate is covered with at least one of the solid electrolyte sheet and the separator.

In the manufacturing method of the laminated battery, the solid electrolyte sheet may be a sheet made of a solid electrolyte.

In the manufacturing method of the laminated battery, in the fitting step, fitting may be performed so that the negative electrode structure is disposed on both outer layers of the battery laminate.

DESCRIPTION OF THE EMBODIMENTS

Figure 1A:
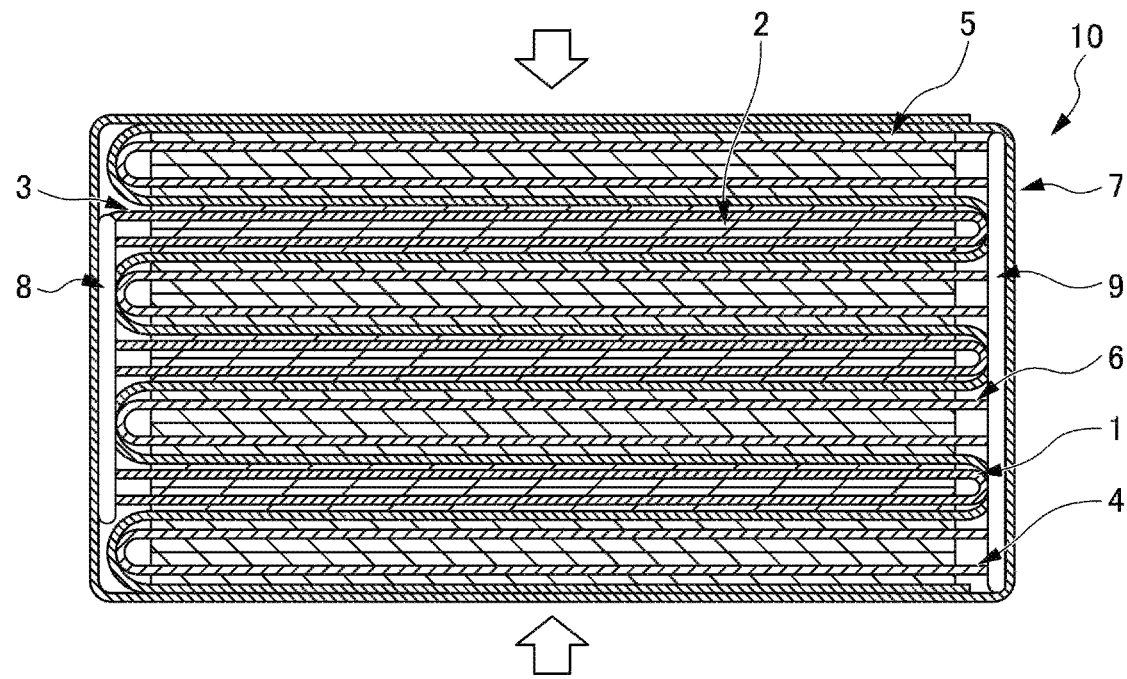
FIG. 1(a) and FIG. 1(b) are a top view and a side view of a laminated battery according to an embodiment of the disclosure.

Since the laminated battery of the disclosure can realize a laminated structure in which the electrode composite material portions are not displaced, the manufacturing process can be simplified. Moreover, even in the case where a sufficient lamination press pressure and confining pressure are applied, buckling, short circuits, and even drop-off of the electrode composite material can be suppressed, and as a result, the production yield can be improved.

In addition, since lamination press molding with a high load is possible, the laminated battery that can improve the adhesion of the laminated interfaces, has improved energy density and power density, and also has a long life can be realized.

Hereinafter, embodiments of the disclosure will be described with reference to the drawings.

<Laminated Battery>

A laminated battery of the disclosure includes a positive electrode sheet and a negative electrode sheet.

In the laminated battery of the disclosure, the positive electrode sheet alternately has positive electrode composite material coated portions and positive electrode composite material uncoated portions on at least one surface of a positive electrode current collector, wherein in the positive electrode composite material coated portions, a positive electrode composite material is laminated, and in the positive electrode composite material uncoated portions, the positive electrode composite material is not laminated; the positive electrode sheet is folded in a manner of mountain folds and valley folds alternated to form a comb-shaped positive electrode structure having a plurality of positive electrode portion laminates in which the adjacent positive electrode composite material coated portions are disposed on both outer layers, a plurality of positive electrode opening portions formed between the adjacent positive electrode portion laminates, and positive electrode portion laminate connecting portions for connecting the adjacent positive electrode portion laminates.

Further, in the laminated battery of the disclosure, the negative electrode sheet is folded in a manner of mountain folds and valley folds alternated to form a comb-shaped negative electrode structure having a plurality of negative electrode portion laminates, a plurality of negative electrode opening portions formed between the adjacent negative electrode portion laminates, and negative electrode portion laminate connecting portions for connecting the adjacent negative electrode portion laminates.

Then, the negative electrode portion laminates of the negative electrode structure are inserted into the positive electrode opening portions of the positive electrode structure, and the positive electrode portion laminates of the positive electrode structure are inserted into the negative electrode opening portions of the negative electrode structure to form a laminate in which the positive electrode structure and the negative electrode structure are fitted.

The type of the laminated battery of the disclosure is not particularly limited. It may be a liquid battery including a liquid electrolyte or a solid battery including a solid or gel electrolyte. Further, in the case where it is a battery including a solid or gel electrolyte, the electrolyte may be organic or inorganic.

Figure 1B:
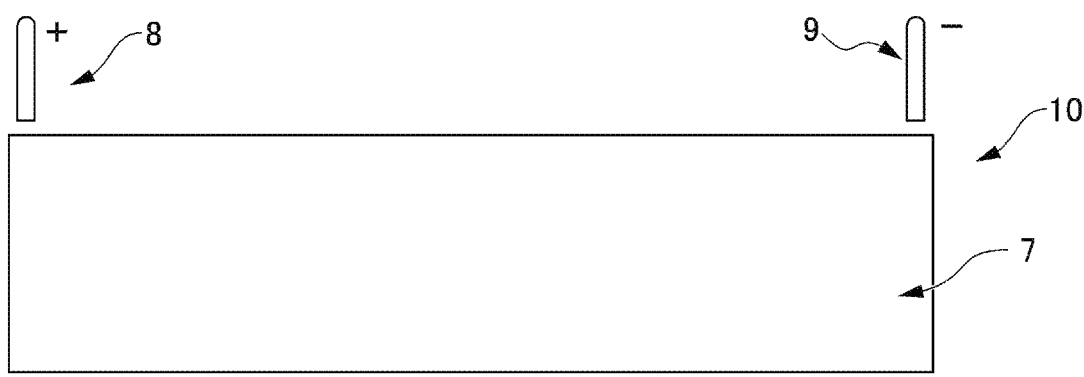

An embodiment of the laminated battery of the disclosure is shown in FIG. 1. FIG. 1($a$) is a top view of a laminated battery 10 of the disclosure, and FIG. 1($b$) is a side view thereof.

The laminated battery 10 shown in FIG. 1 includes a positive electrode sheet 1, a negative electrode sheet 4, and a solid electrolyte sheet 7 as its components.

The positive electrode sheet 1 has, on a positive electrode current collector, positive electrode composite material coated portions 2 in which positive electrode composite material layers are laminated, and positive electrode composite material uncoated portions 3 without the positive electrode composite material layers. Then, the positive electrode sheet 1 is folded so that mountain folds and valley folds alternate to form a comb-shaped positive electrode structure having a plurality of positive electrode portion laminates in which the adjacent positive electrode composite material coated portions 2 are disposed on both outer layers, a plurality of positive electrode opening portions formed between the adjacent positive electrode portion laminates, and positive electrode portion laminate connecting portions for connecting the adjacent positive electrode portion laminates. In addition, the positive electrode composite material uncoated portions 3 are disposed in the positive electrode portion laminate connecting portions.

FIG. 5($a$) shows a comb-shaped positive electrode structure configuring the laminated battery 10. The positive electrode structure of FIG. 5($a$) is in a comb shape in which the positive electrode sheet 1 is folded so that mountain folds and valley folds alternate and which has the plurality of positive electrode portion laminates in which the adjacent positive electrode composite material coated portions 2 are disposed on both outer layers, the plurality of positive electrode opening portions formed between the adjacent positive electrode portion laminates, and the positive electrode portion laminate connecting portions for connecting the adjacent positive electrode portion laminates. Further, the positive electrode composite material uncoated portions 3 of the positive electrode sheet 1 are disposed in the positive electrode portion laminate connecting portions (indicated by b in FIG. 5($a$)) and mountain fold portions (indicated by a in FIG. 5($a$)) of the positive electrode portion laminates.

Further, in the laminated battery 10 shown in FIG. 1, the negative electrode sheet 4 has, on a negative electrode current collector, negative electrode composite material coated portions 5 in which negative electrode composite material layers are laminated, and negative electrode composite material uncoated portions 6 without the negative electrode composite material layers. Then, the negative electrode sheet 4 is folded so that mountain folds and valley folds alternate to form a comb-shaped negative electrode structure having the plurality of negative electrode portion laminates in which the adjacent negative electrode composite material coated portions 5 are disposed on both outer layers, the plurality of negative electrode opening portions formed between the adjacent negative electrode portion laminates, and the negative electrode portion laminate connecting portions for connecting the adjacent negative electrode portion laminates. In addition, the negative electrode composite material uncoated portions 6 are disposed in the negative electrode portion laminate connecting portions.

Figures 5A, 5B:
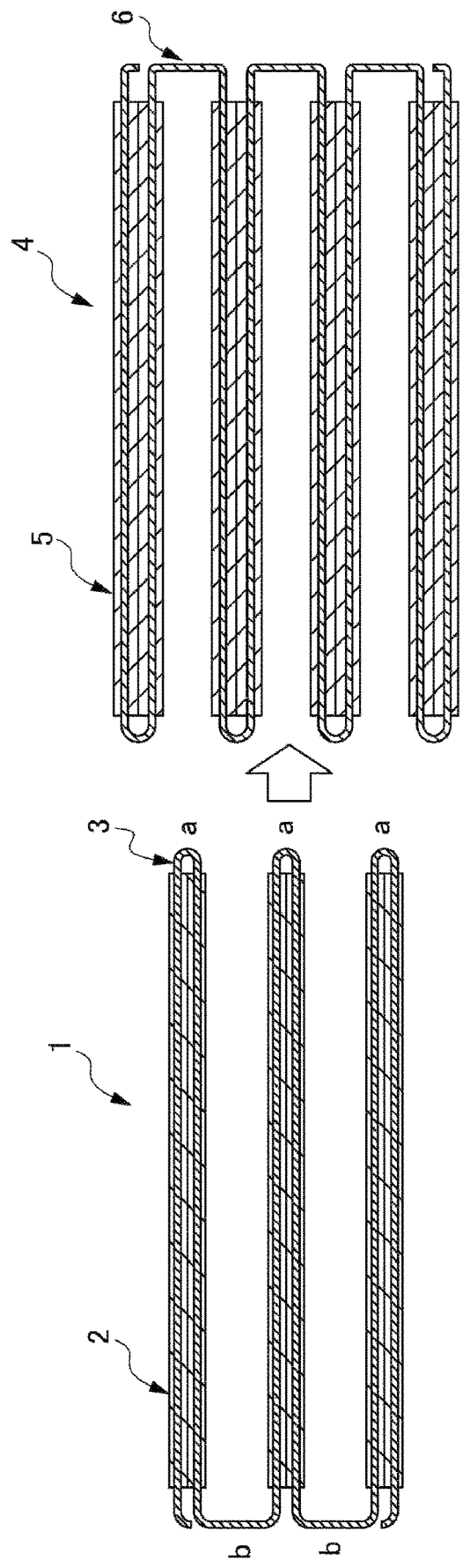
FIG. 5($a$) and FIG. 5($b$) are a view showing a manufacturing process of the laminated battery of the disclosure.

FIG. 5(b) shows the comb-shaped negative electrode structure configuring the laminated battery 10. The negative electrode structure of FIG. 5(b) is in a comb shape in which the negative electrode sheet 4 is folded so that mountain folds and valley folds alternate and which has the plurality of negative electrode portion laminates in which the adjacent negative electrode composite material coated portions 5 are disposed on both outer layers, the plurality of negative electrode opening portions formed between the adjacent negative electrode portion laminates, and the negative electrode portion laminate connecting portions for connecting the adjacent negative electrode portion laminates. Further, the negative electrode composite material uncoated portions 6 of the negative electrode sheet 4 are disposed in the negative electrode portion laminate connecting portions and mountain fold portions of the negative electrode portion laminates.

In the laminated battery 10 according to the embodiment shown in FIG. 1, the negative electrode portion laminates of the negative electrode structure (FIG. 5(b)) are inserted into the positive electrode opening portions of the positive electrode structure (FIG. 5(a)), and the positive electrode portion laminates of the positive electrode structure are inserted into the negative electrode opening portions of the negative electrode structure, and the solid electrolyte sheet 7 is disposed in a zigzag shape at the boundary between the positive electrode portion laminates and the negative electrode portion laminates.

The laminated battery of the disclosure is characterized in that the positive electrode structure and the negative electrode structure in comb shapes are respectively produced with the electrode composite material layers positioned in advance, and these are fitted to form a laminate serving as a battery. In this way, compared with the conventional manufacturing method of a laminated battery of alternately laminating positive electrode sheets and negative electrode sheets of desired sizes cut into any shape, the manufacturing process can be simplified, and at the same time, the laminated structure in which the electrode composite material portions are not displaced can be realized, and the production yield can be improved.

In addition, the arrows shown in FIG. 1 are the directions of the lamination press applied to the laminated battery 10. In particular, in order to ensure and maintain a desired performance, a solid battery requires press molding at a high surface pressure in a state in which a laminate serving as the battery is formed. In the laminated battery 10 shown in FIG. 1, the required pressing is applied from the arrow directions which are the lamination directions of the positive electrode portion laminates and the negative electrode portion laminates.

Here, it is preferable that the outermost layer of the laminated battery of the disclosure is a solid electrolyte sheet, and that the negative electrode portion laminates are disposed on the inner side of the solid electrolyte sheet. With this configuration, the safety of the battery can be improved.

In the laminated battery 10 according to the embodiment shown in FIG. 1, the outermost layer is the solid electrolyte sheet 7; specifically, the battery laminate, which is a fitting body of the positive electrode structure and the negative electrode structure, is covered with end portions of the solid electrolyte sheet 7 inserted in a zigzag shape. Further, the negative electrode portion laminates are disposed on the inner side of the solid electrolyte sheet 7 serving as the outermost layer of the laminated battery 10.

[Positive Electrode Sheet]

The positive electrode sheet, which is a component of the laminated battery of the disclosure, is a configuration in which the positive electrode composite material layers are laminated on at least one surface of the positive electrode current collector. The positive electrode composite material layers of the positive electrode sheet used in the disclosure are characterized in that they are not formed on the entire surface of the positive electrode current collector but are formed discontinuously. As a result, the positive electrode sheet, which is a component of the laminated battery of the disclosure, has, on the positive electrode current collector, the positive electrode composite material coated portions in which the positive electrode composite material is laminated and the positive electrode composite material uncoated portions in which the positive electrode composite material is not laminated.

Moreover, the positive electrode sheet may be any configuration as long as the positive electrode composite material layers are laminated on at least one surface of the positive electrode current collector, and depending on the type of the positive electrode current collector, the positive electrode composite material layers may be laminated on both surfaces of the positive electrode current collector.

Figure 2:
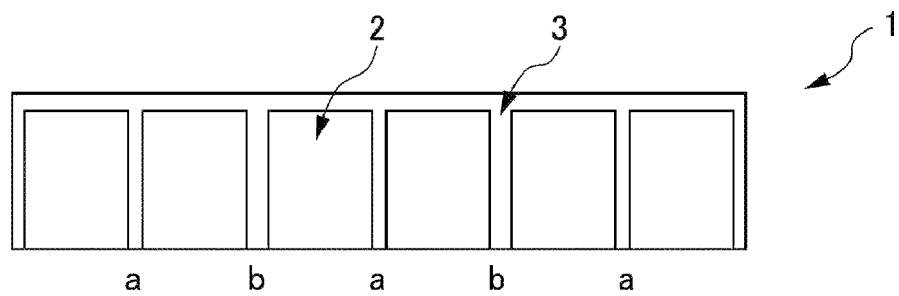
FIG. 2 is a view showing the positive electrode sheet which is a component of the laminated battery according to an embodiment of the disclosure.

FIG. 2 is a view showing an embodiment of the positive electrode sheet which is a component of the laminated battery of the disclosure. As shown in FIG. 2, the positive electrode sheet 1 has, on the positive electrode current collector, the positive electrode composite material coated portions 2 in which the positive electrode composite material is laminated, and the positive electrode composite material uncoated portions 3 in which the positive electrode composite material is not laminated; and the positive electrode composite material coated portions 2 and the positive electrode composite material uncoated portions 3 are alternately formed.

(Positive Electrode Current Collector)

The positive electrode current collector configuring the positive electrode sheet, which is a component of the laminated battery of the disclosure, is not particularly limited, and a positive electrode current collector known as a positive electrode current collector of a lithium ion secondary battery can be applied.

The material of the positive electrode current collector may be, for example, metal materials such as SUS, Ni, Cr, Au, Pt, Al, Fe, Ti, Zn, Cu and the like. Moreover, the shape of the positive electrode current collector may be, for example, a foil shape, a plate shape, a mesh shape, a non-woven fabric shape, a foam shape or the like. In order to improve adhesion, carbon and the like may be disposed on the surface of the positive electrode current collector, and the surface may be roughened. The thickness thereof is not particularly limited either, and can be appropriately selected according to the needs.

(Positive Electrode Composite Material)

In the positive electrode sheet used in the disclosure, the electrode composite material to be laminated on the positive electrode current collector is not particularly limited, and a known composite material that can be used when a battery is produced can be applied.

The positive electrode composite material contains at least a positive electrode active material, and may further contain a solid electrolyte, a conductive assistant, a binder and the like. The positive electrode active material is not particularly limited as long as it can store and release lithium ions, and may be, for example, LiCoO$_2$, LiCoO$_4$, LiMn$_2$O$_4$, LiNiO$_2$, LiFePO$_4$, lithium sulfide, sulfur or the like.

(Positive Electrode Composite Material Coated Portion and Positive Electrode Composite Material Uncoated Portion)

In the positive electrode sheet, which is a component of the laminated battery of the disclosure, the positive electrode composite material layers are discontinuously formed on the positive electrode current collector. As a result, the positive electrode sheet has the positive electrode composite material coated portions in which the positive electrode composite material is laminated, and the positive electrode composite material uncoated portions in which the positive electrode composite material is not laminated. Further, in the laminated battery of the disclosure, the positive electrode sheet is folded so that mountain folds and valley folds alternate, so that the positive electrode composite material coated portions are laminated, to form the plurality of positive electrode portion laminates in which the adjacent positive electrode composite material coated portions are disposed on both outer layers, so as to form the positive electrode structure. It is preferable that the positive electrode structure has the plurality of positive electrode opening portions formed between the adjacent positive electrode portion laminates and the positive electrode portion laminate connecting portions for connecting the adjacent positive electrode portion laminates, and that the positive electrode composite material uncoated portions are disposed in the positive electrode portion laminate connecting portions.

In the case where all the positive electrode portion laminate connecting portions of the positive electrode structure configuring the laminated battery of the disclosure are the positive electrode composite material uncoated portions, the positive electrode composite material is not present in the positive electrode portion laminate connecting portions and the positive electrode opening portions. For this reason, for example, even in a case where the negative electrode composite material layers are disposed in the peripheral region of the positive electrode portion laminate connecting portions at the end portions of the battery laminate, the function of a battery is not exhibited. In addition, since a lamination press with a high load can be performed only on a lamination portion where the positive electrode composite material coated portions are laminated, the adhesion of the laminated interfaces of the portion functioning as a battery can be improved, and as a result, energy density and power density of the obtained battery can be improved, and long life can be realized.

In the positive electrode sheet according to the embodiment of the disclosure shown in FIG. 2, the positive electrode composite material coated portions 2 and the positive electrode composite material uncoated portions 3 are alternately formed, and a and b in the figure show the distances between each of the positive electrode composite material coated portions 2.

FIG. 5(a) shows the comb-shaped positive electrode structure configuring the laminated battery 10 shown in FIG. 1 and formed from the positive electrode sheet 1 shown in FIG. 2. The positive electrode structure of FIG. 5(a) is a structure in a comb shape in which the positive electrode sheet 1 is folded so that mountain folds and valley folds alternate and which has the plurality of positive electrode portion laminates in which the adjacent positive electrode composite material coated portions 2 are disposed on both outer layers, the plurality of positive electrode opening portions formed between the adjacent positive electrode portion laminates, and the positive electrode portion laminate connecting portions for connecting the adjacent positive electrode portion laminates. Further, the positive electrode composite material uncoated portions 3 of the positive electrode sheet 1 are disposed in the positive electrode portion laminate connecting portions (indicated by b in FIG. 5(a)) and the mountain fold portions (indicated by a in FIG. 5(a)) of the positive electrode portion laminates.

Accordingly, the positive electrode composite material uncoated portions in the positive electrode sheet are disposed at one of the two ends (a and b in FIG. 5(a)) of the positive electrode structure by every other one, and form the positive electrode portion laminate connecting portions (b in FIG. 5(a)) by every other one.

In the positive electrode sheet used in the disclosure, the size of the positive electrode composite material coated portions and the distances between each of the positive electrode composite material coated portions can be appropriately set according to the size and the like of the battery to be configured. In particular, the distances between the positive electrode composite material uncoated portions serving as the positive electrode portion laminate connecting portions can be appropriately set depending on the thickness of the negative electrode structure or the like to be fitted with the positive electrode structure. That is, a battery laminate having a desired thickness and a desired size can be formed by making the distances between the positive electrode composite material coated portions different from each other by every other one (a and b in FIG. 2).

Moreover, the positive electrode sheet used in the disclosure may have a solid electrolyte layer on the surface. The solid electrolyte layer may be disposed so as to cover at least the positive electrode composite material coated portions. By making the positive electrode sheet have the solid electrolyte layer, it is not necessary to use a solid electrolyte sheet or a separator when producing a battery, and the production process can be simplified.

In the positive electrode sheet, anything capable of lithium ion conduction between the positive electrode and the negative electrode may be used as a solid electrolyte disposed on the positive electrode composite material coated portions, and may be, for example, oxide electrolytes, sulfide electrolytes, inorganic solid electrolytes such as lithium-containing salts, polymer-based solid electrolytes such as polyethylene oxide, gel-based solid electrolytes containing lithium-containing salts or lithium ion conductive ionic liquids, or the like. In addition, the solid electrolyte may include a binder and the like according to the needs.

[Negative Electrode Sheet]

The negative electrode sheet, which is a component of the laminated battery of the disclosure, is not particularly limited as long as it has a function of performing current collection of a negative electrode active material layer. A negative electrode active material is not particularly limited as long as it can store and release lithium ions, and may be, for example, metallic lithium, lithium alloys, metal oxides, metal sulfides, metal nitrides, silicon oxides, silicon, carbon materials such as graphite, or the like.

It is preferable that the negative electrode sheet used in the laminated battery of the disclosure is a sheet made of the negative electrode active material itself. In the case of the sheet made of the negative electrode active material, when the negative electrode structure is configured or when it is fitted with the positive electrode structure, the laminated battery of the disclosure can be manufactured without considering the disposition of the negative electrode composite material.

Further, in the case where the negative electrode sheet is the sheet made of the negative electrode active material itself, the negative electrode active material is present at the end portions of the obtained laminated battery; however, since the positive electrode active material is not present in the peripheral region of the positive electrode portion laminate connecting portions and the positive electrode opening portions, which are the end portions of the formed battery laminate, the end portions do not exhibit the function as a battery.

Moreover, the negative electrode sheet used in the laminated battery of the disclosure may be a configuration in which the negative electrode composite material layers are formed on at least one surface of the negative electrode current collector. In this case, the negative electrode composite material layers may be formed on the entire surface of the negative electrode current collector or may be formed discontinuously as in the case of the positive electrode sheet.

In the case of the configuration in which the negative electrode composite material layers are formed on the negative electrode current collector, it may be any configuration as long as the negative electrode composite material layers are laminated on at least one surface and, depending on the type of the negative electrode current collector, may be laminated on both surfaces of the negative electrode current collector.

Further, in the case where the negative electrode composite material layers are discontinuously formed on the negative electrode current collector, it is preferable to alternately have the negative electrode composite material coated portions in which the negative electrode composite material is laminated, and the negative electrode composite material uncoated portions in which the negative electrode composite material is not laminated. Then, when the negative electrode structure formed from the negative electrode sheet is fitted with the positive electrode structure, it is preferable to adjust so that the negative electrode composite material coated portions are laminated and disposed on the positive electrode composite material coated portions, and that the negative electrode composite material uncoated portions are disposed in the negative electrode portion laminate connecting portions.

Figure 3:
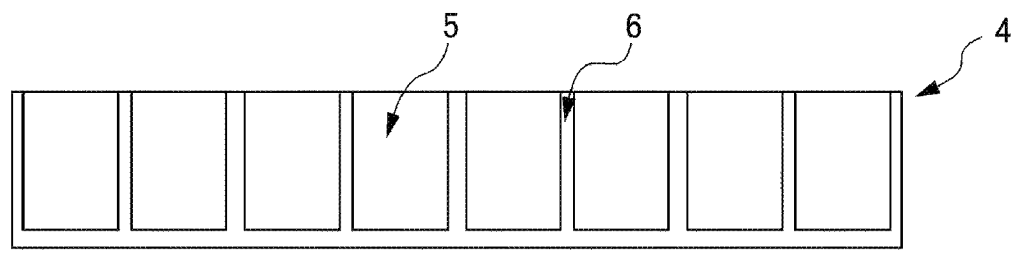
FIG. 3 is a view showing the negative electrode sheet which is a component of the laminated battery according to an embodiment of the disclosure.

In the negative electrode sheet according to the embodiment of the disclosure shown in FIG. 3, the negative electrode composite material coated portions 5 and the negative electrode composite material uncoated portions 6 are alternately formed.

FIG. 5(b) shows the comb-shaped negative electrode structure configuring the laminated battery 10 shown in FIG. 1 and formed from the negative electrode sheet 4 shown in FIG. 3. The negative electrode structure of FIG. 5(b) is a structure in a comb shape in which the negative electrode sheet 4 is folded so that mountain folds and valley folds alternate and which has the plurality of negative electrode portion laminates in which the adjacent negative electrode composite material coated portions 5 are disposed on both outer layers, the plurality of negative electrode opening portions formed between the adjacent negative electrode portion laminates, and the negative electrode portion laminate connecting portions for connecting the adjacent negative electrode portion laminates. Further, the negative electrode composite material uncoated portions 6 of the negative electrode sheet 4 are disposed in the negative electrode portion laminate connecting portions and the mountain fold portions of the negative electrode portion laminates.

Accordingly, the negative electrode composite material uncoated portions in the negative electrode sheet are disposed at one of the two ends of the negative electrode structure by every other one, and form the negative electrode portion laminate connecting portions by every other one.

In the negative electrode sheet used in the disclosure, the size of the negative electrode composite material coated portions and the distances between each of the negative electrode composite material coated portions can be appropriately set according to the size and the like of the battery to be configured. In particular, the distances between the negative electrode composite material uncoated portions serving as the negative electrode portion laminate connecting portions can be appropriately set depending on the thickness of the positive electrode structure or the like to be fitted with the negative electrode structure. That is, a battery laminate having a desired thickness and a desired size can be formed by making the distances between the negative electrode composite material coated portions different from each other by every other one.

When the negative electrode sheet includes a current collector, the negative electrode current collector is not particularly limited, and a known negative electrode current collector can be applied. The material of the negative electrode current collector may be, for example, Cu, SUS, Ni, Ti or the like, and the shape of the negative electrode current collector may be, for example, a foil shape, a plate shape, a mesh shape, a non-woven fabric shape, a foam shape or the like. Moreover, in order to improve adhesion, carbon and the like may be disposed on the surface of the negative electrode current collector, and the surface may be roughened. The thickness of the negative electrode current collector is not particularly limited either, and can be appropriately selected according to the needs.

Further, the negative electrode composite material is not particularly limited, and a known composite material that can be used when a battery is produced can be applied. The negative electrode composite material contains at least the negative electrode active material, and may further contain a solid electrolyte, a conductive assistant, a binder and the like according to the needs.

In addition, in the case of the negative electrode sheet of a configuration in which the negative electrode composite material layers are laminated, it is preferable that the area of the negative electrode composite material coated portions is greater than or equal to the area of the positive electrode composite material coated portions of the positive electrode sheet. When the positive electrode composite material coated portions are smaller than the negative electrode composite material coated portions, by the press after laminating and disposing these to form the battery laminate, the positive electrode composite material coated portions are buried in the inner side of the negative electrode composite material coated portions, and cracking may occur at the end portions of the negative electrode composite material coated portions. Moreover, electrocrystallization can be avoided by setting the area of the negative electrode composite material coated portions to be equal to or greater than the area of the positive electrode composite material coated portions of the positive electrode sheet.

Among these, it is preferable that the area of the negative electrode composite material coated portions and the area of the positive electrode composite material coated portions are equal. If the areas are equal, the pressure of the lamination press can be uniformly applied, and the resistance value can be reduced.

Moreover, the negative electrode sheet used in the disclosure may have a solid electrolyte layer on the surface. In the case where the negative electrode sheet has the solid electrolyte layer, the solid electrolyte layer may be disposed so as to cover at least the negative electrode composite material coated portions. In the case where the negative electrode sheet is a sheet made of the negative electrode active material itself, the solid electrolyte layer may be laminated on the entire negative electrode sheet. By making the negative electrode sheet have the solid electrolyte layer, it is not necessary to use a solid electrolyte sheet or a separator when producing a battery, and the production process can be simplified.

In the case where the negative electrode sheet has the solid electrolyte layer, the solid electrolyte may be the same as or different from the above-described one used in the positive electrode sheet. Anything capable of lithium ion conduction between the positive electrode and the negative electrode may be used, and may be, for example, oxide electrolytes, sulfide electrolytes, inorganic solid electrolytes such as lithium-containing salts, polymer-based solid electrolytes such as polyethylene oxide, gel-based solid electrolytes containing lithium-containing salts or lithium ion conductive ionic liquids, or the like. In addition, the solid electrolyte may include a binder and the like according to the needs.

[Solid Electrolyte Sheet]

In the laminated battery of the disclosure, a solid electrolyte sheet may be used as an optional component. In the case where the solid electrolyte sheet is used in the laminated battery of the disclosure, the solid electrolyte sheet is disposed between the positive electrode portion laminates and the negative electrode portion laminates. In addition, in the case where at least one of the positive electrode sheet and the negative electrode sheet has the solid electrolyte layer as described above, the laminated battery of the disclosure can be configured without using the solid electrolyte sheet.

The solid electrolyte sheet used in the disclosure is not particularly limited, and may be, for example, a dense sheet comprising an inorganic solid electrolyte and a binder, a composite sheet made by embedding a solid electrolyte in a porous sheet such as a non-woven fabric configured by polypropylene, cellulose, glass and the like, or an organic solid electrolyte sheet, or the like.

Anything capable of lithium ion conduction between the positive electrode and the negative electrode may be used as the solid electrolyte used in the solid electrolyte sheet, and may be, for example, oxide electrolytes, sulfide electrolytes, inorganic solid electrolytes such as lithium-containing salts, polymer-based solid electrolytes such as polyethylene oxide, gel-based solid electrolytes containing lithium-containing salts or lithium ion conductive ionic liquids, or the like. In addition, the solid electrolyte may include a binder and the like according to the needs. The composition ratio of each substance contained in the solid electrolyte is not particularly limited as long as the battery can operate properly.

In the case where only one solid electrolyte sheet is used in the laminated battery of the disclosure, the disposition of the solid electrolyte sheet may be, for example, an aspect in which it is disposed in a zigzag shape at the boundary between the positive electrode portion laminates and the negative electrode portion laminates.

Figure 4:
FIG. 4 is a view showing the solid electrolyte sheet which is a component of the laminated battery according to an embodiment of the disclosure.

FIG. 4 shows the solid electrolyte sheet 7 which configures the laminated battery 10 shown in FIG. 1. In the laminated battery 10 shown in FIG. 1, the negative electrode portion laminates of the negative electrode structure are inserted into the positive electrode opening portions of the positive electrode structure, and the positive electrode portion laminates of the positive electrode structure are inserted into the negative electrode opening portions of the negative electrode structure, and the solid electrolyte sheet 7 is disposed in a zigzag shape at the boundary between the positive electrode portion laminates and the negative electrode portion laminates.

Figure 6A:
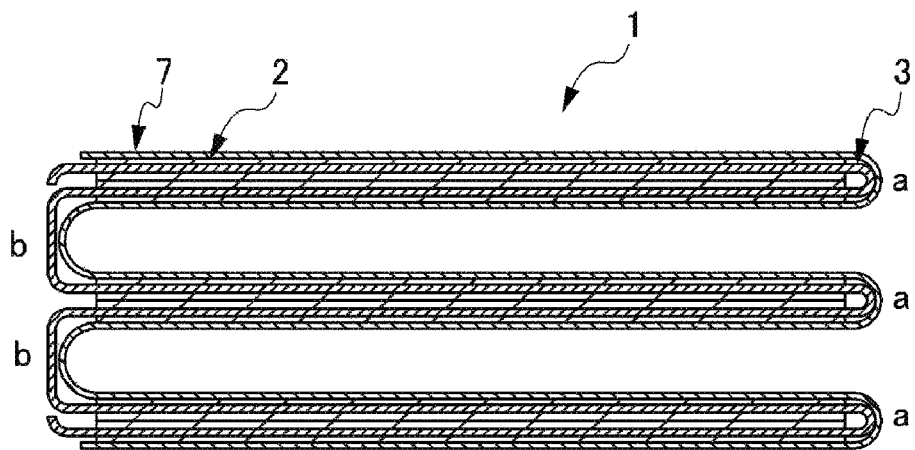
FIG. 6($a$) and FIG. 6($b$) are respectively a view showing an example of the disposition relationship between the positive electrode structure and the solid electrolyte sheet.

FIG. 6 shows an example of the disposition relationship between the positive electrode structure and the solid electrolyte sheet. FIG. 6(a) is a view showing the disposition relationship between the positive electrode structure and the solid electrolyte sheet 7 which is an embodiment for obtaining the laminated battery 10 shown in FIG. 1. In FIG. 6(a), the solid electrolyte sheet 7 is disposed in zigzag shape along the front and back surfaces of the positive electrode portion laminates of the positive electrode structure. The laminated battery 10 shown in FIG. 1 can be formed, for example, by inserting and fitting the positive electrode portion laminates into the negative electrode opening portions of the negative electrode structure in a state where the solid electrolyte sheet 7 is disposed on the positive electrode portion laminates as shown in FIG. 6(a).

In the laminated battery of the disclosure, for the purpose of improving the safety, it is preferable that a solid electrolyte sheet having a sufficient length is used, and the outer periphery of the laminated battery is covered with the end portions of the solid electrolyte sheet so that the outermost layer is the solid electrolyte sheet. In addition, it is preferable to dispose the negative electrode portion laminates on the inner side of the solid electrolyte sheet.

The outermost layer of the laminated battery 10 shown in FIG. 1 is the solid electrolyte sheet 7; specifically, the battery laminate, which is a fitting body of the positive electrode structure and the negative electrode structure, is covered with the end portions of the solid electrolyte sheet 7 inserted in a zigzag shape. Further, the negative electrode portion laminates are disposed on the inner side of the solid electrolyte sheet 7 serving as the outermost layer of the laminated battery 10.

Other disposition forms of the solid electrolyte sheet include, for example, an aspect in which a bag having opening portions is formed by the solid electrolyte sheet, and at least one of the positive electrode portion laminates and the negative electrode portion laminates is inserted from the opening portions, and the solid electrolyte sheet is disposed to cover the front and back surfaces of the portion laminates, and the solid electrolyte sheet is not disposed on the portion laminate connecting portions.

Figure 6B:
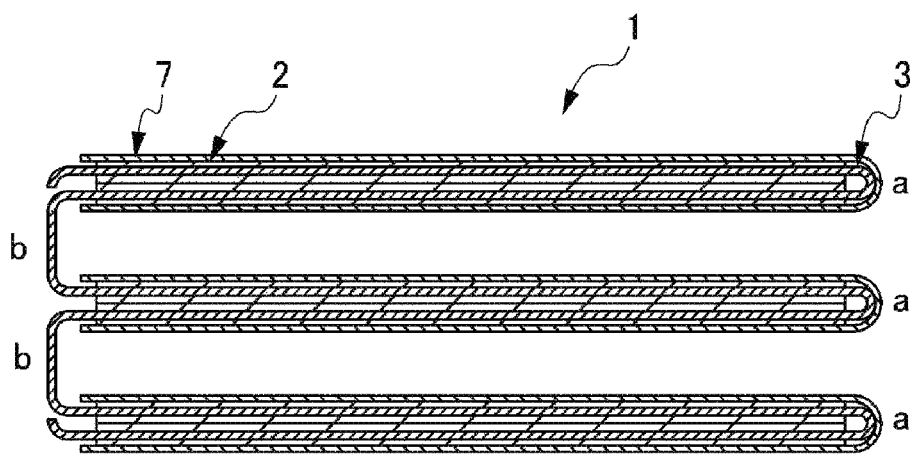

FIG. 6(b) shows an embodiment in which the solid electrolyte sheet is disposed in a bag shape. In FIG. 6(b), the positive electrode portion laminates are inserted from the opening portions of the bag formed by the solid electrolyte sheet 7, and the solid electrolyte sheet 7 is disposed along the front and back surfaces of the positive electrode portion laminates. Further, the solid electrolyte sheet 7 is not disposed on the positive electrode portion laminate connecting portions. The laminated battery can be formed by inserting and fitting the positive electrode portion laminates into the negative electrode opening portions of the negative electrode structure in a state where the solid electrolyte sheet 7 is disposed on the positive electrode portion laminates as shown in FIG. 6(b).

[Separator]

In the laminated battery of the disclosure, a separator may be used as an optional component. In the case where the laminated battery of the disclosure has the separator, the separator is disposed between the positive electrode portion laminates and the negative electrode portion laminates. By using a separator, the laminated battery of the disclosure can be in an aspect in which a liquid electrolyte is used.

The separator used in the laminated battery of the disclosure is not particularly limited as long as it can be impregnated with an electrolyte solution and the like, and a separator known as a separator of a lithium ion secondary battery can be applied. For example, a porous sheet such as a non-woven fabric, a porous film and the like may be used.

The material of the separator is not particularly limited either, and may be, for example, polypropylene, polyethylene, polyethylene terephthalate, polybutylene terephthalate, ethylene-propylene copolymer, cellulose, or the like.

Further, the basis weight and thickness of the separator are not particularly limited either, and may be appropriately set according to the required performance and the like of the laminated battery.

[Electrolyte Solution]

In the case where the laminated battery of the disclosure is a battery including a liquid electrolyte, an electrolyte solution is used. The electrolyte solution used in the laminated battery of the disclosure is not particularly limited, and a known electrolyte solution used in a lithium ion secondary battery can be applied.

For example, ethylene carbonate, dimethyl carbonate, ethyl methyl carbonate, propylene carbonate or the like may be used, or a composite material thereof may be used as a solvent which configures the electrolyte solution. Moreover, for example, lithium-containing salts, such as $LiPF_6$, $LiBF_4$, $LiClO_4$ and the like, or lithium-containing ionic liquids, such as LiTFSi and the like, may be used, or a composite material thereof may be used as an electrolyte which configures the electrolyte solution. In addition, the electrolyte solution may contain an additive and the like according to the needs.

[Other Configurations]

The laminated battery of the disclosure may optionally include other configurations for achieving the function as a battery.

For example, it is preferable that a positive electrode tab is connected to the positive electrode portion laminate connecting portions of the laminated battery of the disclosure, and that a negative electrode tab is connected to the negative electrode portion laminate connecting portions. According to the configuration of the laminated battery of the disclosure, it is possible to collect current from one layer of the positive electrode portion laminates and one layer of the negative electrode portion laminates, respectively, and as a result, it is possible to collect current with a low resistance.

Further, the package form of the laminated battery of the disclosure is not particularly limited. For example, it may be enclosed in a metal can to form a can cell, or may be enclosed in a laminate sheet of aluminum or the like to form a laminate cell.

<Manufacturing Method of the Laminated Battery>

The manufacturing method of the laminated battery of the disclosure is not particularly limited, and may be, for example, a method including a positive electrode sheet forming step, a positive electrode structure forming step, a negative electrode structure forming step, and a fitting step.

[Positive Electrode Sheet Forming Step]

The positive electrode sheet forming step is a step of forming the positive electrode sheet alternately having the positive electrode composite material coated portions and the positive electrode composite material uncoated portions on at least one surface of the positive electrode current collector, wherein in the positive electrode composite material coated portions, the positive electrode composite material is laminated by discontinuously coating the positive electrode composite material, and in the positive electrode composite material uncoated portions, the positive electrode composite material is not laminated.

A method of discontinuously coating the positive electrode composite material is not particularly limited. For example, it may be a method of forming a positive electrode composite material containing a positive electrode active material, coating the positive electrode composite material on the positive electrode current collector by discontinuous coating, and then performing drying and rolling.

Further, in the disclosure, in the positive electrode sheet forming step, the solid electrolyte layer may be formed at least on the positive electrode composite material coated portions. The forming method of the solid electrolyte layer is not particularly limited, and a known method can be applied.

[Positive Electrode Structure Forming Step]

The positive electrode structure forming step is a step of folding the positive electrode sheet obtained in the positive electrode sheet forming step so that mountain folds and valley folds alternate to form the comb-shaped positive electrode structure including the plurality of positive electrode portion laminates in which the adjacent positive electrode composite material coated portions are disposed on both outer layers, the plurality of positive electrode opening portions formed between the adjacent positive electrode portion laminates, and the positive electrode portion laminate connecting portions for connecting the adjacent positive electrode portion laminates.

The means of folding the positive electrode sheet so that mountain folds and valley folds alternate and the method of forming the plurality of positive electrode portion laminates in which the adjacent positive electrode composite material coated portions are disposed on both outer layers are not particularly limited, as long as the positive electrode structure having the positive electrode portion laminates, the positive electrode opening portions, and the positive electrode portion laminate connecting portions can be formed.

In addition, in the positive electrode structure forming step, it is preferable that the positive electrode composite material uncoated portions are disposed in the positive electrode portion laminate connecting portions. Moreover, when the plurality of positive electrode portion laminates are formed, it is preferable to form so that lamination displacement between the adjacent positive electrode composite material coated portions does not occur.

[Negative Electrode Structure Forming Step]

The negative electrode structure forming step is a step of folding the negative electrode sheet so that mountain folds and valley folds alternate to form the comb-shaped negative electrode structure including the plurality of negative electrode portion laminates, the plurality of negative electrode opening portions formed between the adjacent negative electrode portion laminates, and the negative electrode portion laminate connecting portions for connecting the adjacent negative electrode portion laminates.

The means of folding the negative electrode sheet so that mountain folds and valley folds alternate and the method of forming the plurality of negative electrode portion laminates are not particularly limited, as long as the negative electrode structure having the negative electrode portion laminates, the negative electrode opening portions, and the negative electrode portion laminate connecting portions can be formed.

Further, the negative electrode sheet may be configured by the sheet made of the negative electrode active material itself, or may be configured by the negative electrode composite material layers formed on at least one surface of the negative electrode current collector. In the case where it is configured by the negative electrode composite material layers formed on the negative electrode current collector, it is preferable that the area of the negative electrode composite material coated portions is greater than or equal to the area of the positive electrode composite material coated portions.

Further, in the case of using the sheet configured by the negative electrode composite material layers formed on the negative electrode current collector as the negative electrode sheet, it is preferable that the negative electrode composite material uncoated portions are disposed in the negative electrode portion laminate connecting portions. Moreover, when the plurality of negative electrode portion laminates are formed, it is preferable to form so that lamination displacement between the adjacent negative electrode composite material coated portions does not occur.

Moreover, in the disclosure, a negative electrode sheet having a solid electrolyte layer on the surface may be used as the negative electrode sheet. In the case where the negative electrode sheet has the solid electrolyte layer, the solid electrolyte layer may be disposed at least on the surface of the negative electrode composite material coated portions. In the case where the negative electrode sheet is the sheet made of the negative electrode active material itself, the solid electrolyte layer may be laminated on the entire negative electrode sheet. The forming method of the solid electrolyte layer is not particularly limited, and a known method can be applied.

[Fitting Step]

The fitting step is a step of inserting the negative electrode portion laminates of the negative electrode structure obtained in the negative electrode structure forming step into the positive electrode opening portions of the positive electrode structure obtained in the positive electrode structure forming step, inserting the positive electrode portion laminates of the positive electrode structure into the negative electrode opening portions of the negative electrode structure, and fitting the positive electrode structure and the negative electrode structure to form the battery laminate.

In the fitting step, when the positive electrode structure and the negative electrode structure are fitted, according to the needs, at least one of the solid electrolyte sheet and the separator may be disposed between the positive electrode portion laminates and the negative electrode portion laminates to form the battery laminate.

In the case of applying at least one of the solid electrolyte sheet and the separator, in order to improve the safety of the obtained battery, in the fitting step, it is desirable to dispose so that the outermost layer of the battery is the solid electrolyte sheet or the separator. For this reason, it is preferable to use the solid electrolyte sheet or the separator having a sufficient length to cover the outer periphery of the laminated battery with its end portions. In addition, it is preferable to dispose the negative electrode portion laminates on the inner side of the solid electrolyte sheet or the separator.

The manufacturing method of the laminated battery of the disclosure is characterized in respectively producing the positive electrode structure and the negative electrode structure in comb shapes with the electrode composite material layers positioned in advance, and fitting these to form the laminate serving as a battery. In this way, compared with the conventional manufacturing method of a laminated battery of alternately laminating positive electrode sheets and negative electrode sheets of desired sizes cut into any shape, the manufacturing process can be simplified, and at the same time, the laminated structure in which the electrode composite material portions are not displaced can be realized, and the production yield can be improved.

Further, in the case of using the sheet configured by the negative electrode composite material layers formed on the negative electrode current collector as the negative electrode sheet, in the fitting step, it is preferable to adjust so that the negative electrode composite material coated portions are laminated and disposed on the positive electrode composite material coated portions.

FIG. 5 shows a schematic view of the fitting step. FIG. 5(a) shows the comb-shaped positive electrode structure, and FIG. 5(b) shows the comb-shaped negative electrode structure. In the fitting step in the manufacturing method of the laminated battery of the disclosure, the battery laminate is formed by inserting the negative electrode portion laminates of the negative electrode structure of FIG. 5(b) into the positive electrode opening portions of the positive electrode structure of FIG. 5(a), inserting the positive electrode portion laminates of the positive electrode structure of FIG. 5(a) into the negative electrode opening portions of the negative electrode structure of FIG. 5(b), and fitting the positive electrode structure and the negative electrode structure.

In the manufacturing method of the laminated battery of the disclosure, in the case where one solid electrolyte sheet is used, in the fitting step, it may be, for example, an aspect in which the solid electrolyte sheet is disposed in a zigzag shape at the boundary between the positive electrode portion laminates and the negative electrode portion laminates.

FIG. 6(a) shows an embodiment of the positive electrode structure and the solid electrolyte sheet for obtaining the laminated battery 10 shown in FIG. 1. In FIG. 6(a), the solid electrolyte sheet 7 is disposed in zigzag shape along the front and back surfaces of the positive electrode portion laminates of the positive electrode structure. In the fitting step for obtaining the laminated battery 10 shown in FIG. 1, for example, the battery laminate is formed by using the positive electrode structure in which the solid electrolyte sheet 7 is disposed on the positive electrode portion laminates as shown in FIG. 6(a), and inserting and fitting the positive electrode portion laminates into the negative electrode opening portions of the negative electrode structure.

Moreover, in a fitting step according to another embodiment, for example, it may be an example of using an electrode structure in a state in which a bag having opening portions is formed by the solid electrolyte sheet, and at least one of the positive electrode portion laminates and the negative electrode portion laminates is inserted from the opening portions, and the solid electrolyte sheet is disposed to cover the front and back surfaces of the electrode portion laminates, and the solid electrolyte sheet is not disposed on the electrode portion laminate connecting portions.

With reference to FIG. 6(b), a fitting step in the case of using the electrode structure which has disposed the solid electrolyte sheet in a bag shape is described. In FIG. 6(b), the positive electrode portion laminates are inserted from the opening portions of the bag formed by the solid electrolyte sheet 7, and the solid electrolyte sheet 7 is disposed along the front and back surfaces of the positive electrode portion laminates. Further, the solid electrolyte sheet 7 is not disposed on the positive electrode portion laminate connecting portions. In the fitting step, the battery laminate is formed by using the positive electrode structure which has disposed the solid electrolyte sheet 7 as shown in FIG. 6(b), and inserting and fitting the positive electrode portion laminates into the negative electrode opening portions of the negative electrode structure.

[Pressing Step]

In the disclosure, a pressing step which applies a pressure to the lamination directions of the obtained battery laminate may be further performed. In particular, in order to ensure and maintain a desired performance, a solid battery requires press molding at a high surface pressure in a state in which a laminate serving as the battery is formed.

FIG. 1 shows the directions of the lamination press to be applied to the laminated battery 10 as the arrows. In the laminated battery 10 shown in FIG. 1, the required pressing is applied from the arrow directions, which are the lamination directions of the positive electrode portion laminates and the negative electrode portion laminates, to sandwich the battery laminate.

What is claimed is:

1. A laminated battery comprising a positive electrode sheet and a negative electrode sheet, wherein
    the positive electrode sheet alternately has positive electrode composite material coated portions and positive electrode composite material uncoated portions on at least one surface of a positive electrode current collector, wherein in the positive electrode composite material coated portions, a positive electrode composite material is laminated, and in the positive electrode composite material uncoated portions, the positive electrode composite material is not laminated,
    the positive electrode sheet is folded in a manner of mountain folds and valley folds alternated to form a comb-shaped positive electrode structure, wherein the comb-shaped positive electrode structure comprises
        a plurality of positive electrode portion laminates in which the adjacent positive electrode composite material coated portions are disposed on both outer layers and a positive electrode composite material uncoated portion disposed between the adjacent positive electrode composite material coated portions forms a mountain fold portion of the positive electrode portion laminates,
        a plurality of positive electrode opening portions formed between the adjacent positive electrode portion laminates, and
        positive electrode portion laminate connecting portions for connecting the adjacent positive electrode portion laminates,
        wherein the positive electrode composite material uncoated portions of the positive electrode sheet are disposed in the positive electrode portion laminate connecting portions and the mountain fold portions of the positive electrode portion laminates,
    the negative electrode sheet alternately has negative electrode composite material coated portions and negative electrode composite material uncoated portions on at least one surface of a negative electrode current collector, wherein in the negative electrode composite material coated portions, a negative electrode composite material is laminated, and in the negative electrode composite material uncoated portions, the negative electrode composite material is not laminated,
    the negative electrode sheet is folded in a manner of mountain folds and valley folds alternated to form a comb-shaped negative electrode structure, wherein the comb-shaped negative electrode structure comprises
        a plurality of negative electrode portion laminates in which the adjacent negative electrode composite material coated portions are disposed on both outer layers and a negative electrode composite material uncoated portion disposed between the adjacent negative electrode composite material coated portions forms a mountain fold portion of the negative electrode portion laminates,
        a plurality of negative electrode opening portions formed between the adjacent negative electrode portion laminates, and
        negative electrode portion laminate connecting portions for connecting the adjacent negative electrode portion laminates, and
    wherein the negative electrode composite material uncoated portions of the negative electrode sheet are disposed in the negative electrode portion laminate connecting portions and the mountain fold portions of the negative electrode portion laminates,
    the negative electrode portion laminates of the negative electrode structure are inserted into the positive electrode opening portions of the positive electrode structure, and the positive electrode portion laminates of the positive electrode structure are inserted into the negative electrode opening portions of the negative electrode structure to form a laminate in which the positive electrode structure and the negative electrode structure are fitted, the mountain fold portions of the positive electrode portion laminates are fitted to the negative electrode portion laminate connecting portions, and the mountain fold portions of the negative electrode portion laminates are fitted to the positive electrode portion laminate connecting portions,
    wherein a solid electrolyte sheet is disposed between the positive electrode structure and the negative electrode structure.

2. The laminated battery according to claim 1, wherein the positive electrode composite material uncoated portions are disposed in the positive electrode portion laminate connecting portions.

3. The laminated battery according to claim 1, wherein the negative electrode sheet is a sheet made of a negative electrode active material.

4. The laminated battery according to claim 1, wherein the area of the negative electrode composite material coated portions is greater than or equal to the area of the positive electrode composite material coated portions.

5. The laminated battery according to claim 1, wherein a positive electrode tab is connected to the positive electrode portion laminate connecting portions, and
    a negative electrode tab is connected to the negative electrode portion laminate connecting portions.

6. The laminated battery according to claim 1, wherein at least one of the positive electrode sheet and the negative electrode sheet has a solid electrolyte layer on a surface.

7. The laminated battery according to claim 1, wherein an outermost layer of the laminated battery is the solid electrolyte sheet, and the negative electrode portion laminates are disposed on an inner side of the solid electrolyte sheet.

8. The laminated battery according to claim 1, wherein the solid electrolyte sheet is a sheet comprising a solid electrolyte.

9. A manufacturing method of a laminated battery comprising a positive electrode sheet and a negative electrode sheet, the manufacturing method comprising:
    a positive electrode sheet forming step of forming a positive electrode sheet alternately having positive electrode composite material coated portions and positive electrode composite material uncoated portions on at least one surface of a positive electrode current collector, wherein in the positive electrode composite material coated portions, a positive electrode composite material is laminated by discontinuously coating the positive electrode composite material, and in the positive electrode composite material uncoated portions, the positive electrode composite material is not laminated;

a positive electrode structure forming step of folding the positive electrode sheet in a manner of mountain folds and valley folds alternated to form a comb-shaped positive electrode structure, wherein the comb-shaped positive electrode structure comprising a plurality of positive electrode portion laminates in which the adjacent positive electrode composite material coated portions are disposed on both outer layers and a positive electrode composite material uncoated portion disposed between the adjacent positive electrode composite material coated portions forms a mountain fold portion of the positive electrode portion laminates, a plurality of positive electrode opening portions formed between the adjacent positive electrode portion laminates, positive electrode portion laminate connecting portions for connecting the adjacent positive electrode portion laminates, and wherein the positive electrode composite material uncoated portions of the positive electrode sheet are disposed in the positive electrode portion laminate connecting portions and the mountain fold portions of the positive electrode portion laminates, a negative electrode sheet forming step of forming a negative electrode sheet alternately having negative electrode composite material coated portions and negative electrode composite material uncoated portions on at least one surface of a negative electrode current collector, wherein in the negative electrode composite material coated portions, a negative electrode composite material is laminated by discontinuously coating the negative electrode composite material, and in the negative electrode composite material uncoated portions, the negative electrode composite material is not laminated;

a negative electrode structure forming step of folding the negative electrode sheet in a manner of mountain folds and valley folds alternated to form a comb-shaped negative electrode structure, wherein the comb-shaped negative electrode structure comprising a plurality of negative electrode portion laminates in which the adjacent negative electrode composite material coated portions are disposed on both outer layers and a negative electrode composite material uncoated portion disposed between the adjacent negative electrode composite material coated portions forms a mountain fold portion of the negative electrode portion laminates, a plurality of negative electrode opening portions formed between the adjacent negative electrode portion laminates, and negative electrode portion laminate connecting portions for connecting the adjacent negative electrode portion laminates; and wherein the negative electrode composite material uncoated portions of the negative electrode sheet are disposed in the negative electrode portion laminate connecting portions and the mountain fold portions of the negative electrode portion laminates, a fitting step of inserting the negative electrode portion laminates of the negative electrode structure into the positive electrode opening portions of the positive electrode structure, inserting the positive electrode portion laminates of the positive electrode structure into the negative electrode opening portions of the negative electrode structure, and fitting the positive electrode structure and the negative electrode structure to form a battery laminate, wherein the mountain fold portions of the positive electrode portion laminates are fitted to the negative electrode portion laminate connecting portions, and the mountain fold portions of the negative electrode portion laminates are fitted to the positive electrode portion laminate connecting portions, wherein in the fitting step, a solid electrolyte sheet is disposed between the positive electrode portion laminates and the negative electrode portion laminates.

10. The manufacturing method of the laminated battery according to claim 9, wherein in the positive electrode structure forming step, the positive electrode composite material uncoated portions are disposed in the positive electrode portion laminate connecting portions.

11. The manufacturing method of the laminated battery according to claim 9, wherein the negative electrode sheet is a sheet made of a negative electrode active material.

12. The manufacturing method of the laminated battery according to claim 9, wherein the area of the negative electrode composite material coated portions is greater than or equal to the area of the positive electrode composite material coated portions.

13. The manufacturing method of the laminated battery according to claim 9, wherein at least one of the positive electrode sheet and the negative electrode sheet has a solid electrolyte layer on a surface.

14. The manufacturing method of the laminated battery according to claim 9, wherein in the fitting step, an outer periphery of the battery laminate is covered with the solid electrolyte sheet.

15. The manufacturing method of the laminated battery according to claim 9, wherein the solid electrolyte sheet is a sheet comprising a solid electrolyte.

16. The manufacturing method of the laminated battery according to claim 9, wherein in the fitting step, fitting is performed so that the negative electrode structure is disposed on both outer layers of the battery laminate.

* * * * *